(No Model.)
J. TRUMPY.
STORAGE BATTERY SYSTEM OF DISTRIBUTION.
No. 511,821. Patented Jan. 2, 1894.
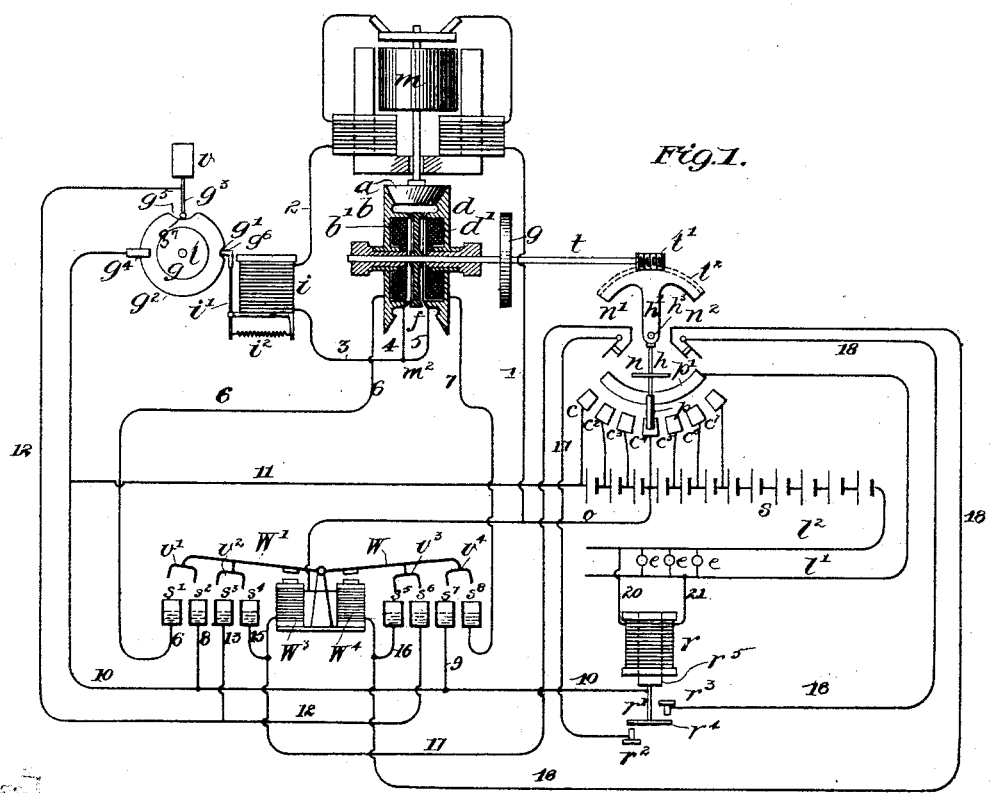
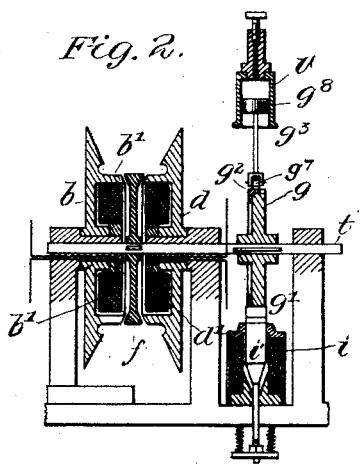
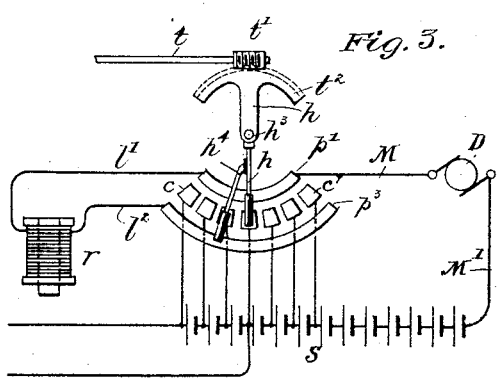
WITNESSES:
INVENTOR
Jakob Trumpy,
BY
his ATTORNEYS

UNITED STATES PATENT OFFICE.

JAKOB TRUMPY, OF HAGEN, GERMANY.

STORAGE-BATTERY SYSTEM OF DISTRIBUTION.

SPECIFICATION forming part of Letters Patent No. 511,821, dated January 2, 1894.

Application filed August 1, 1893. Serial No. 482,056. (No model.) Patented in Germany July 1, 1892, No. 62,998.

*To all whom it may concern:*

Be it known that I, JAKOB TRUMPY, a subject of the King of Sweden and Norway, residing in Hagen, Westphalia, Germany, have invented an Improvement in Storage-Battery Systems of Distribution, (for which I have received Letters Patent in Germany, No. 62,998, dated July 1, 1892,) of which the following is a specification.

My present invention relates to storage battery systems of distribution, and has for its object to maintain a constant potential between terminals, in order to secure a uniform action of the translating devices in circuit. I attain this object by the mechanism illustrated in the accompanying drawings in which—

Figure 1 is a view showing the circuits and apparatus in theoretical diagram. Fig. 2 is a sectional detail view of the clutch mechanism. Fig. 3 is a view showing a slightly modified arrangement of contacts and circuits for a special purpose hereinafter described.

In the drawings $s\ s$ are storage batteries connected together in series, and at intervals to contacts $c$ to $c^7$ of the commutating switch. The mains $l'$ and $l^2$, which feed the translating devices $e\ e$ lead from the circuit closing rail $p'$ and one terminal of the battery, respectively. The circuit of the mains and translating devices is closed by the brush $p$, bearing on the rail $p'$ and one of the contacts $c$ to $c^7$. The brush $p$ is mounted on an extension $h$, of an arm $h'$, pivoted at $h^3$, and having on its other end a toothed sector, with which meshes a worm $t'$, on a shaft $t$. Upon rotation of the shaft in either direction, the arm $h'$ is swung on its pivot, and the brush $p$ sweeps over the commutating switch, and alters the number of cells of battery in circuit, and consequently the voltage on line. This rotation of the shaft $t$ is accomplished by means of the motor $m$, which gears with the shaft $t$ by means of a friction pulley $a$, engaging a clutch on the shaft $t$. This clutch (see Fig. 2) consists of an iron disk $f$ fast on the shaft $t$. The other members of the clutch consist of magnets $b$—$d$ on either side of the disk having coils $b'$—$d'$. These magnets are loose on the shaft, and are rotated in opposite directions by the friction pulley $a$ of the motor. As long as no current is flowing in either of the coils, $b'$—$d'$, the disk $f$ will be out of engagement with the magnets, and the shaft $t$ will remain at rest. To cause rotation of the shaft in either direction, a current is sent through coil $b'$ or $d'$, when the magnet $b$ or $d$ will be energized, and attract the disk $f$, and draw it up to the magnet. The disk will now rotate with the magnet. The direction and duration of rotation of the disk, and consequent direction and amplitude of movement of the brush $p$ may thus be controlled and regulated by regulating the admission of current to one or the other of the coils.

The circuits of the motor and clutch magnets are completed in the following manner. The course of the current is as follows: from battery by wires $o$, 1, through motor $m$, by wire 2 to and through magnet $i$, by wire 3 to the point $m^2$. Here since only one of the magnets $b$, $d$ is to be energized at a time, the current has two paths back to battery only one of which is available at a time. One is by wire 4, coil $b'$, wire 6, mercury cup $s'$, bridging wire $v'$ (when the circuit is closed) mercury cup $s^2$, wires 10 and 11 to the battery. The other path is by wire 5, coil $d'$, wire 7, mercury cup $s^3$, bridging wire $v^4$, mercury cup $s^7$, wires 9, 10 and 11 to battery. The circuits of the clutch magnets are closed and controlled by the arms W and W' carrying bridging wires $v^3$, $v^2$ and operated respectively by magnets $W^4$, $W^3$. These magnets have a common return to battery by wire $o$. Wire 17 leads from magnet $W^3$ to contact $r^2$, and wire 18 leads from magnet $W^4$ to contact $r^3$. Either circuit is completed by contact piece $r^4$ stem and wires 10 and 11 to battery. From the mains $l^2$, $l'$, current is taken by wires 20, 21, to any suitable form of contact volt meter, or other electro responsive device here shown as a solenoid $r$ having a core $r^5$ suspended, within it. Upon the core is a stem $r'$ carrying a contact piece $r^4$ for co-operating with $r^2$ or $r^3$. The windings of $r$ and the mass of iron in the core are so proportioned that when the normal current for the translating devices is flowing in the mains, the core will be maintained at such a height as to hold the contact piece $r^4$ clear of either $r^2$ or $r^3$. When, for any cause, the tension of the current rises above or falls below normal, the core $r^5$ will be correspondingly raised or lowered by the increase or decrease of the current in $r$, and the contact piece $r^4$ will touch $r^3$ or $r^2$.

The detailed operation of the device is as follows. Rise or fall of the tension in the mains will cause the contact piece $r^4$ to contact with $r^3$ or $r^2$ as previously explained. For convenience I will suppose that there is a rise of potential. In that case contact will be made between $r^3$ and $r^4$ and the circuit of magnet $W^4$ will be closed, and the arm $W$ drawn down closing the circuit of motor $m$ and coil $d'$ between mercury cups $s^7$ $s^8$. This will energize the magnet $d$ and attract the disk $f$, and hold $d$ and $f$ in frictional contact, and at the same time start the motor to rotate $b$ and $d$. Since $f$ and $d$ are in frictional contact, the disk $f$ and shaft $t$ on which it is mounted, will rotate with $d$, and by means of the worm $t'$ and segment $t^2$, rock the arm $h'$ and move the brush $p$ to the right to decrease the number of calls in circuit. As soon as sufficient battery has been cut out to lower the tension to normal, the core $r^5$ will drop to its normal position and separate $r^3$ and $r^4$, thus breaking the circuit of magnet $W^4$, which in turn breaks the circuit of motor $m$ and stops the movement of the brush $p$.

A decrease in the tension will produce a movement of the brush $p$ in an opposite direction by means of the motor, magnets $W^3$ and $b$ and their circuits as described.

It may happen that the contact between $r^4$ and $r^2$ or $r^3$ may be very weak or only momentary, which may result in no movement of the brush, $p$, or only such a slight movement as will not be sufficient to carry it from one contact to the other, resulting in a breaking of the battery circuit and stoppage of the current in the mains. In order to obviate this difficulty I provide a means for short circuiting the contacts of the contact volt meter (when the contact has been once made) during an entire revolution of the motor $m$, it being understood that the worm $t'$ and sector $t^2$ are geared to move the brush from one contact to another during one entire revolution of the shaft $t$. I have shown such a means as a disk $g$ on the shaft $t$, having a conducting rim or periphery $g^2$, but it will be obvious that any suitable means may be used. A small notch $g^6$ in the rim of $g$ is for the reception of detent $g'$ on the armature $i'$, of the magnet $i$, interpolated in wires 2, 3, of the clutch circuit. The detent is held in engagement with the wheel $g$ by means of the spring $i^2$. When the circuit of the motor and magnet $i$ is completed, the armature $i'$ is drawn up to the magnet $i$, and the shaft $t$ is free to revolve. A stem $g^3$, carrying the roller $g^7$, rests normally in the notch or depression $g^5$ of the wheel $g$, and has at its other end a piston $g^8$, working in a dash-pot $v$, to which the exhaust and admission of air is regulated by the valve $v'$. The rim of the wheel $g$ serves to electrically connect the stem $g^3$ and brush $g^4$. The brush $g^4$ is electrically connected to battery by wires 10 and 11. The wire 10 is also electrically connected to $r'$. The stem $g^3$ is electrically connected by wires 12 and 13 to mercury cups $s^6$ and $s^3$. The neighboring cups $s^5$ and $s^4$ are electrically connected by wires 16 and 15 to wires 18 and 17, which pass through the magnets $W^4$ and $W^3$ and merge into a common return $o$ to battery.

When, during the operation of the circuit-changing system, the arm $W$ or $W'$ is drawn down by its magnet, the circuit through the disk $g$ will be completed by means of $v^3$ or $v^2$, and the contact points of the contact volt meter will be short circuited therethrough. The circuit of the magnet controlling the circuit closing arm $W$ or $W'$ will, however, remain unbroken. As soon as the shaft begins to revolve, the roller $g^7$ will ride up on the side of the notch $g^5$, and the piston $g^8$ will be forced into the dash-pot. The roller will now run on the periphery of the disk until the shaft has made a complete revolution when the notch or depression $g^5$ will come under the roller, and as the dash-pot will not allow of a sudden return movement of the stem $g^3$, the circuit will be broken, and if the contacts of the volt meter be not still in engagement, the motion of the shaft will cease. If, however, the volt meter still maintains the points in contact, the circuit through the magnet $W^3$ or $W^4$ will still be complete, and the rotation of the shaft will continue. If, at any time during a revolution, the contact volt meter should allow the contacts to separate, the motor would continue to revolve until the break of the short circuit by the depression $g^5$, when the motion would cease. It will be readily seen that a complete movement of the brush from one contact to the other of the commutator is at all times assured, no matter what the character or duration of the contact made by the contact volt meter, it being understood that the magnets $W^3$, $W^4$ and $i$ are of such character as to respond to an impulse of short duration. A like arrangement may also be used for cutting in or out cells of a charging circuit as may be seen in Fig. 3. The conductors $M$ $M'$ lead to a dynamo $D$. The shaft $t$ is turned by the same means as in Fig. 1, and causes the brush $p$ to traverse the commutator in the same manner. The brush $p$ closes circuit between the rail $p'$ and contacts $c$ to $c^7$. One pole of the generator is electrically connected by conductor $M$ with the rail $p'$, the other by conductor $M'$ with a terminal of the battery. The battery is connected up with the contacts in the same manner as in Fig. 1. The contact volt meter $r$ is electrically connected with the rail $p'$ by wire $l'$, and with rail $p^3$ by wire $l^2$. The brush $h^4$ closes circuit between the rail $p^3$ and the contacts $c$ to $c^7$, and is mounted on the arm $h$, but insulated therefrom, and is arranged to bear on the contact $c$ to $c^7$ adjacent to that on which the brush $p$ bears. The contact volt meter, and the remainder of the system not shown in Fig. 3 may be, in all respects, similar to that shown in Fig. 3. In order to prevent the brush or brushes from moving too far, so as to move off the table of contacts of the commutator, I provide the arm $h$ with some means of breaking the circuit of the magnets $W^3 W^4$. This I have shown as a cross-head $n$ co operating with circuit-breakers $n'$ $n^2$ at opposite extremities of its path. Similar devices may be used in the construction shown in Fig. 3.

It will be obvious that the arrangement and construction of circuits and apparatus may be varied without departing from the spirit of my invention. For instance, the driving mechanism of both of the constructions may be so modified that the shaft of the machine $m$ of Fig. 1 actuates two clutch mechanisms. The actuating of the latter as well as the transmitting of the movement thereof to the brushes can, of course, also be accomplished in a different manner from that indicated. Furthermore by changing the form of the brushes and the arms carrying the same only, one set of contacts $c$ to $c^7$ may be necessary, and the number of such plates may also be varied. Bridging plates with resistance coils may also be arranged in known manner between plates $c'$ to $c^7$. Any continuously revolving motor may be substituted for the intermittently operated electric motor herein described, or any change made which would be obvious to a skilled mechanic.

I do not therefore limit myself to the exact devices herein shown, nor to any specific devices for accomplishing the automatic switching of storage batteries in response to the needs of the external circuit or the load on the machine.

What I claim, and desire to secure by Letters Patent, is—

1. In a storage battery system of distribution, the combination with a motor, of a shaft actuating a suitable switch for including a greater or less number of cells of battery in circuit, an electro-magnetic clutch adapted to connect the shaft and motor, and means for maintaining the circuit through said clutch continuous during a predetermined movement of the switch, substantially as described.

2. In a storage battery system of distribution, the combination with a motor, of a shaft actuating a suitable switch for including a greater or less number of cells of battery in circuit, an electro-magnetic clutch adapted to connect the shaft and motor, and means controlled by the rotation of the shaft for maintaining the circuit through said clutch continuous during a predetermined movement of the switch, substantially as described.

3. In a storage battery system of distribution, the combination with a motor, of a shaft actuating a suitable switch for including a greater or less number of cells of battery in circuit, an electro-magnetic clutch adapted to connect the shaft and motor, and a notched disk on the shaft operating a circuit closer to maintain the circuit through said clutch continuous during a predetermined movement of the switch, substantially as described.

4. In a storage battery system of distribution, the combination with a motor, of a shaft actuating a suitable switch for including a greater or less number of cells of battery in circuit, an electro-magnetic clutch adapted to connect the shaft and motor, and an electro-magnetic device in the battery circuit for closing the circuit through the clutch to connect the shaft and motor, substantially as described.

5. In a storage battery system of distribution, the combination with a motor, of a shaft actuating a suitable switch for including a greater or less number of cells of battery in circuit, an electro-magnetic clutch adapted to connect the shaft and motor, an electro-magnetic device in the battery circuit for closing the circuit through the clutch to connect the shaft and motor, and means for maintaining said clutch circuit continuous during a predetermined movement of the switch, substantially as described.

6. In a storage battery system of distribution, the combination with a motor, of a shaft actuating a suitable switch for including a greater or less number of cells of battery in circuit, an electro-magnetic clutch adapted to connect the shaft and motor, means for closing the circuit through the clutch, and an electro-magnet in the clutch circuit controlling a detent to prevent rotation of the shaft as long as no current passes through the clutch magnet, substantially as described.

JAKOB TRUMPY.

Witnesses:
GEO. E. MORSE,
HARRY M. TURK.